Jan. 21, 1964 W. J. HAMPSHIRE 3,118,336
FIBER CUTTER
Filed July 8, 1959 2 Sheets-Sheet 1

INVENTOR.
WILLIAM J. HAMPSHIRE
BY
ATTORNEY

Jan. 21, 1964 W. J. HAMPSHIRE 3,118,336
FIBER CUTTER
Filed July 8, 1959 2 Sheets-Sheet 2

INVENTOR.
WILLIAM J. HAMPSHIRE
BY
*H.H. Oldham*
ATTORNEY

United States Patent Office 3,118,336
Patented Jan. 21, 1964

3,118,336
FIBER CUTTER
William J. Hampshire, Cuyahoga Falls, Ohio, assignor to Goodyear Aerospace Corporation, a corporation of Delaware
Filed July 8, 1959, Ser. No. 825,810
1 Claim. (Cl. 83—100)

This invention relates to fiber cutters, and, more particularly, to apparatus for continuously cutting strands or rovings of glass fibers, and like filaments.

It is the general object of the invention to provide fiber cutter apparatus of the character described which is relatively inexpensive but durable and long-lived, in which cutting blades are inexpensive and can be readily replaced, which performs rapidly and efficiently with a minimum of operator attention, and in which separation of the cut lengths is, in part, effected.

Another object of the invention is to provide apparatus for cutting glass fibers and the like which is particularly adapted for use with resin and fiber spraying mechanism.

The foregoing objects of the invention, and other objects which will become apparent as the description proceeds, are achieved by the provision of apparatus for cutting glass fiber strands and the like including a pair of rolls having resilient covers, means rotatably mounting the rolls on parallel axes and in pressure engagement with each other to flatten the rubber covers of the rolls against each other, means for passing a strand between the rolls to hold the strand firmly between the flattened covers, at least one knife blade carried by a roll and normally surrounded by and circumferentially supported by the resilient cover but supported against radial deflection by the rigid roll and becoming exposed betwen the flattened covers to cut the firmly held strand, and means for rotating at least one roll.

In the drawings, FIG. 1 is a diagrammatic side elevation of a resin and fiber spraying apparatus incorporating the fiber cutting apparatus of the present invention;

Figure 1:
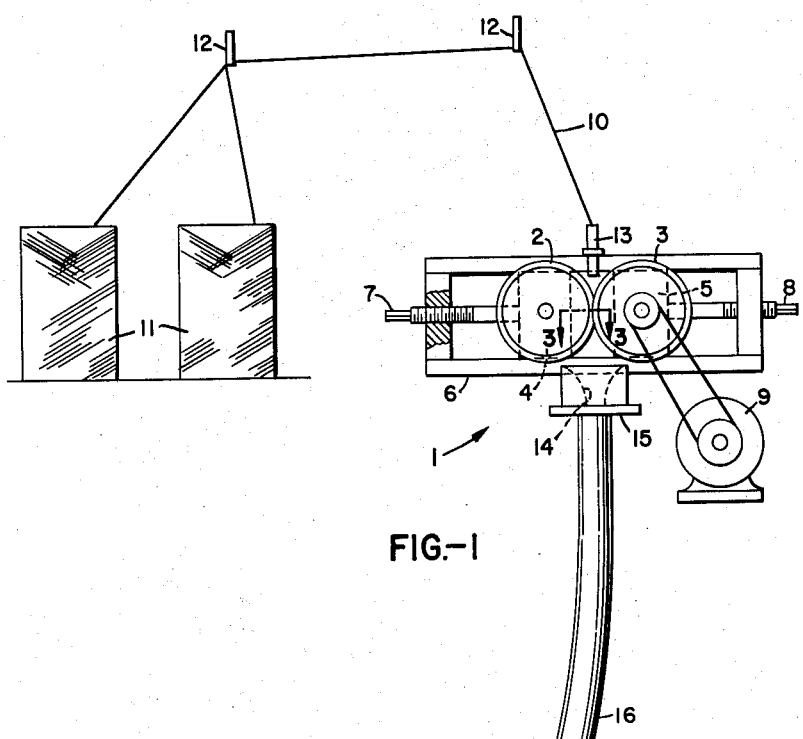

Referring in greater detail to the drawings, and to FIG. 1 thereof, the numeral 1 indicates generally the fiber cutting and feeding apparatus of the invention and including a pair of rolls 2 and 3 mounted on parallel axes in bearing blocks 4 and 5 adjustably received in a frame 6 carrying adjusting screws 7 and 8 engaging with the bearing blocks 4 and 5 to adjust the surfaces of the rolls 2 and 3 into engagement with each other, as hereinafter more particularly described. At least one of the rolls, for example roll 3, is adapted to be continuously rotated, as by an electric motor 9.

Strands or fibers, usually in the form of rovings 10 of glass fiber, or the like, are adapted to be fed between the rolls 2 and 3, and this is conveniently accomplished by providing a plurality of spools 11 of the rovings, the rovings being fed through guide means 12 and guide tubes 13 in side by side relation into the bight between the rolls 2 and 3.

The rovings 10 are cut into relatively short length fibers between the rolls 2 and 3 in the manner which will be hereinafter described, and upon passing from the rolls are immediately sucked into a venturi-shaped throat 14 in a funnel-shaped head 15 positioned immediately beneath the rolls 2 and 3. The head 15 is connected to a flexible conduit 16 of comparatively large diameter, for example between 1½ and 2 inches, which is connected to a nozzle discharge head 17. The nozzle discharge head 17 may be of the type disclosed and claimed in my copending application Serial No. 690,710, filed October 17, 1957 now Patent No. 2,929,436, patented March 22, 1960, and entitled Method and Apparatus for Spraying a Mixture of Fibers and Resin Material, and including one or more air pressure conduits 18 controlled by valves 19 and discharged around venturi throats in the nozzle 17 to thereby pull a considerable vacuum in the venturi throat 14. This vacuum is such that the air rushing into the venturi throat 14 moves through the throat at a speed definitely higher than the passage of the rovings 10 through the rolls 2 and 3. This results in a further breaking up or separating of the relatively short length of filaments or fibers cut from the rovings 10. A flexible conduit 20 extends from the nozzle 17 to a source of suitable resin so that the nozzle 17 discharges a mixture of fibers, resin, and air, all as more particularly taught in my aforesaid patent application.

Figure 2:
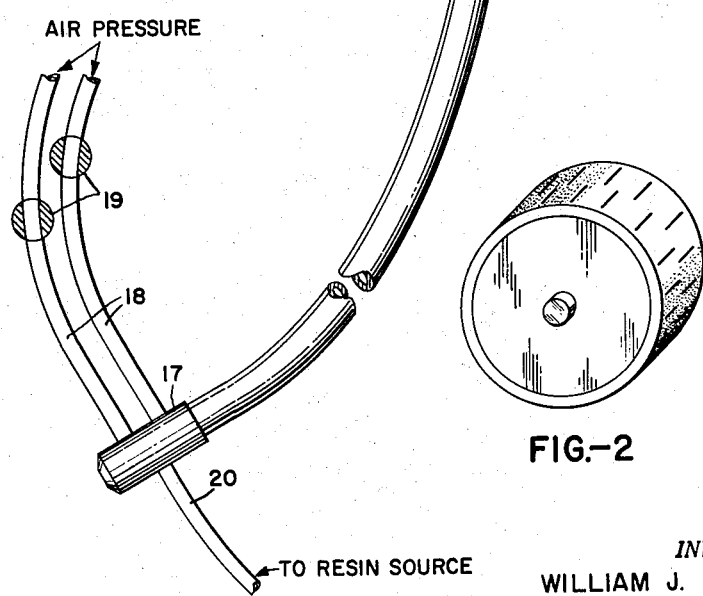
FIG. 2 is an enlarged perspective view of the cutter roll forming a part of the fiber cutting apparatus.
Figure 3:
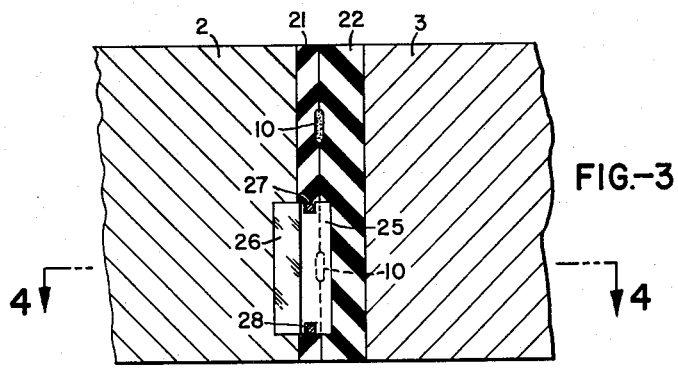
FIG. 3 is an enlarged fragmentary cross-sectional view taken substantially on line 3—3 of FIG. 1.
Figure 4:
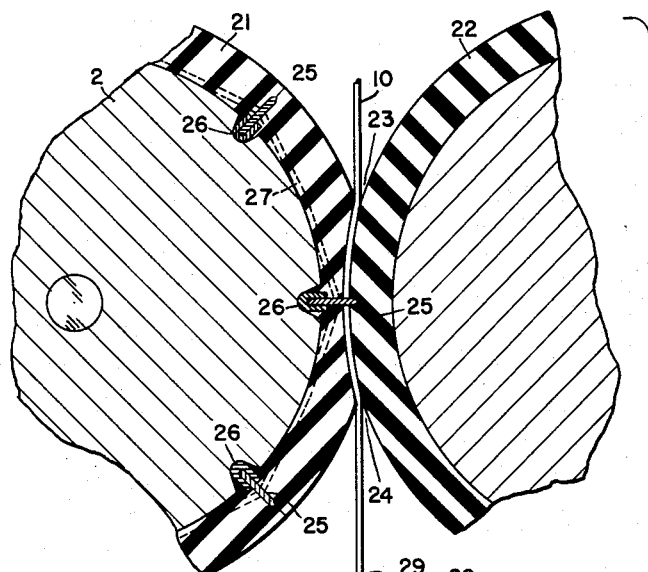
FIG. 4 is a cross-sectional view taken substantially on line 4—4 of FIG. 3.

Returning now to the rolls 2 and 3 and the venturi throat 14, these are shown more specifically in FIGS. 2 to 4. Each of rolls 2 and 3 is formed of rigid material, such as metal, and each is covered with a layer 21 and 22 of resilient material of cylindrical or sleeve-like shape. The resilient material or cover 22 on roll 3 is of a particularly tough and relatively stiff composition being, for example, polyurethane plastic sold commercially by Goodyear Tire & Rubber Company under the trade name SL Rubber. Cover 21 on roll 2, is of a somewhat softer and more flexible material being, for example, a vinyl plastisol, such as sold by U.S. Stoneware Co., Tallmadge, Ohio, under the trade name K77. The durometer hardnesses of the cover 22 may typically be in the range from about 60 to 80, whereas the cover 21 may be in the range of from about 40 to 60.

FIG. 3 shows how the rovings 10 are gripped between the resilient covers 21 and 22 in laterally spaced relation to each other, and FIG. 4 shows how the screws 7 and 8 are adjusted to bring the roll surfaces, and specifically the resilient covers 21 and 22 into flattened engagement with each other in a plane extending from 23 to 24, this plane being parallel to the axes of the rolls 2 and 3, and being perpendicular to the plane defined by the axes. If the resilient covers 21 and 22 were of equal durometer hardness the plane defined between the points 23 and 24 would be substantially flat, but with resilient cover 22 having a greater durometer hardness than the resilient cover 21, the plane between the points 23 and 24 is flatly curved with roll cover 21 being deflected radially inward to substantially concave shape whereas the surface of cover 22 has a convex shape on a curve which is somewhat flatter than the normal cylindrical surface of the resilient cover 22 due to the pressure of the resilient cover 21 thereagainst.

Mounted in circumferentially spaced position about the periphery of roll 2 are a plurality of cutter blades 25 mounted parallel to the roll axis and extending radially from the surface of the metal roll 2. Conveniently the blades 25 are in the form of surgical razor blades each having a length of about 1½ inches and a width of about 5/16 of an inch and a thickness of about 1/64 of an inch. The back and unsharpened edge of each blade is reinforced with a U-shaped channel 26 and this is received in a groove cut in the surface of the metal roll, the groove being of a width to allow some tilting and flexing movement of the blade 25 while the blades are supported against radial deflection by the rigid roll.

In order to hold the blades 25 in position on the periphery of the metal roller 2 flexible wires 27 are extended circumferentially around the rolls, the wires being received in notches 28 formed in the ends of the blade 25 as it is supplied commercially. By extending the wires 27 from one side of one blade to the opposite side of the next blade the blades 25 can be held firmly but flexibly on the periphery of the roll 2 at the time the resilient cover 21 is formed on the roll 2, this usually being accomplished by a casting of the vinyl plastisol about the periphery of roll 2.

The thickness of the resilient cover 21 and the radial extension of each blade 25 is such that each blade 25 normally is surrounded by the resilient cover 21 and the cutting edge of the blade 25 is not exposed except in the area of the cover 21 where the cover is flattened between the points 23 and 24. This is shown in FIG. 4 which illustrates both the cutting edge of the blade 25 exposed between the points 23 and 24, and the cutting edges of other blades 25 outside of the area 23—24 surrounded by the cover 21.

Screws 7 and 8 are adjusted during the actual operation of the apparatus so that the proper cutting action on a roving 10 is achieved, this usually being accomplished by the cutting edge of blade 25 between points 23 and 24 penetrating only a very short distance into the surface of resilient cover 22. In other words, the blade 25 does something slightly more than just "kiss" the surface of cover 22. Depending upon the type of fibers to be cut a slightly greater or less penetration of the blade 25 into the resilient cover 22 is required. In cutting glass fibers the actual cutting operation is a combined one of cutting and breaking, and the penetration of blade 25 into the resilient cover 22 is normally quite small.

As the relatively short lengths of fiber are cut in the manner illustrated in FIG. 4 and are discharged from the bight between the rolls 2 and 3 they are immediately sucked at relatively high speed into the venturi throat 14 of funnel 15 through which air is being sucked at relatively high speed and in the direction shown by the arrows 31. The speed of this air is greater than the surface speed of roll covers 21 and 22 so that a gap 29 is immediately opened up between the fibers 30 which have been cut and that portion of the roving 10 being cut. As shown in FIG. 4 the cut fibers 30 picked up by the rapidly moving air through the throat 14 are beginning to separate or disintegrate from their roving shape. This separation has been found to be highly advantageous in order that the nozzle 17 discharge a more uniform and fully resin-coated mass of fibers from the spray nozzle 17.

It might be noted, also, that the passage of the roving 10 through the cushioned rollers has already sufficiently stressed and to some extent worked the individual fibers in the rovings so that they are more susceptible to separation in the venturi throat 14. Further, it is evident that the filaments of the rovings 10 are very firmly held between the resilient covers 21 and 22 in the area 23—24 so that the action of each cutter blade 25 is against the outwardly arched and thereby tensioned side of each roving so that the cutting action has been found to be quite effective.

FIG. 2 illustrates that the roll 2 is provided with two or more sets of cutter blades, the blades of each set being offset laterally from each other on the roll surface, with each set of blades acting upon a single roving. The blades 25 are not only offset laterally of each other in each set, but are also alternated circumferentially, whereby the cuts on each roving 10 are made alternately with the cuts on every other roving 10. This is advisable to still further improve the distribution of cut fibers sucked at high speed into the venturi throat 14, and further improves the uniformity of distribution of fibers as discharged from the nozzle 17.

As aforesaid, by mounting the individual cutter blades 25 in the manner described, and supporting the blades over their sides with the resilient cover 21 each individual blade 25 is free to some rocking movement, but with the blade sides being resiliently supported. This has been found to improve the cutting action of the blades and reduce breakage.

Should it become necessary to replace the blades 25 on the roll 2, it is a relatively simple operation to cut off cover 21, discard blades 25, wire on a new set of blades, and recast cover 21. The casting of cover 21 over the surface of roll 2 is an easy operation in which the roll 2 with the blades 25 thereon is positioned in a vertical cylindrical mold having an internal diameter equal to the outer diameter of cover 21, with liquid vinyl plastisol being poured between the mold and the roll 2 and then set up by heat.

While a certain representative embodiment and details have been shown for the purpose of illustrating the invention, it will be apparent to those skilled in this art that various changes and modifications may be made therein without departing from the spirit or scope of the invention.

What is claimed is:

Apparatus for cutting strands of glass fiber rovings and the like including a pair of metal rolls the diameter of said rolls being substantially equal, an outer sleeve-like cover of resilient material on each roll, the cover of one roll being of relatively stiff composition and the cover of the other roll being of softer and more resilient material, means mounting the rolls on parallel axes so that the resilient covers of the rolls engage with each other over a substantial flattened area parallel to the axes and perpendicular to the plane defined by the axes, said engagement causing the roll of the more resilient material to be substantially concave with the roll of the stiff material being only slightly flattened from its normal circular contour, means for rotating at least one of the rolls, means for feeding a plurality of rovings in laterally spaced relation into the flattened area between the rolls, a plurality of sets of razor blades, means mounting each blade on the outer peripheral surface of the roll covered with the softer and more resilient material parallel to the roll axis to support the blade against radial deflection and to permit rocking movement thereof, each blade extending radially out into a slit in the softer resilient cover to a distance so that the cutting edge of the blade is exposed for cutting action in the engagement area only, each set of blades being spaced circumferentially around the roll in alignment with a single roving, the blades of each set being staggered circumferentially with the blades of any other set so that cut fibers from each roving are supplied alternately, and tubular venturi-shaped suction means adjacent the bite of the rolls for pulling the cut fibers away from the rolls at a speed faster than the passage of the rovings through the rolls.

References Cited in the file of this patent

UNITED STATES PATENTS

| | | |
|---|---|---|
| 2,347,046 | Geiger | Apr. 18, 1944 |
| 2,581,467 | Bailiff | Jan. 8, 1952 |
| 2,631,668 | Wicker | Mar. 17, 1953 |
| 2,683,208 | Andrews | July 6, 1954 |
| 2,729,028 | Slayter | Jan. 3, 1956 |
| 2,801,439 | Meares | Aug. 6, 1957 |

FOREIGN PATENTS

| | | |
|---|---|---|
| 454,750 | Canada | Feb. 22, 1949 |